Oct. 9, 1962 H. R. BANKS ETAL 3,057,965

BRAILLE TELEPHONE SWITCHBOARD UNIT

Filed Dec. 7, 1960 4 Sheets-Sheet 1

INVENTORS H. R. BANKS
C. NICKERSON
BY J. R. McCorkendale
ATTORNEY

BRAILLE TELEPHONE SWITCHBOARD UNIT

Filed Dec. 7, 1960

INVENTORS H. R. BANKS
C. NICKERSON
BY J. R. McCorkendale
ATTORNEY

Oct. 9, 1962 H. R. BANKS ETAL 3,057,965

BRAILLE TELEPHONE SWITCHBOARD UNIT

Filed Dec. 7, 1960 4 Sheets-Sheet 3

INVENTORS H. R. BANKS
C. NICKERSON
BY F. A. McCorkendale
ATTORNEY

Oct. 9, 1962 H. R. BANKS ET AL 3,057,965

BRAILLE TELEPHONE SWITCHBOARD UNIT

Filed Dec. 7, 1960 4 Sheets-Sheet 4

INVENTORS H. R. BANKS
C. NICKERSON

BY J. R. McCorkendal

ATTORNEY

United States Patent Office 3,057,965

Patented Oct. 9, 1962

3,057,965

BRAILLE TELEPHONE SWITCHBOARD UNIT

Harry R. Banks and Charles Nickerson, Portland, Oreg., assignors to American Telephone and Telegraph Company, New York, N.Y., a corporation of New York Filed Dec. 7, 1960, Ser. No. 74,421
11 Claims. (Cl. 179—91)

This invention relates to a manual telephone switchboard, and more particularly to a braille applique unit for such a switchboard to facilitate operation by a blind attendant.

It has long been recognized that many blind persons, due to their acutely developed senses of hearing and touch, are ideally suited to act as private branch exchange switchboard attendants. It is obvious, of course, that certain modifications are necessary in the usual manual switchboard designed for use by attendants with normal sight, or that auxiliary devices be provided for use in conjunction therewith, in order to permit efficient operation by blind attendants, and, in fact, many innovations have been introduced in recent years by telephone manufacturers toward this end.

It has previously been proposed, for example, to provide in conjunction with manual PBX switchboards an applique unit including a "touch signal," or pin, for each line, trunk and cord of the switchboard. The touch signals are so wired that they will operate, that is project above the surface of the unit, simultaneously with energization of the corresponding line, trunk or cord supervisory lamp. Each signal is provided adjacent thereto with proper braille characters which permit the blind attendant to determine by touch the identity of the line, trunk or cord corresponding to a projected pin.

While the above arrangement has operated in a generally satisfactory manner and has enjoyed fairly extensive use, it has not provided an entirely satisfactory solution to the problem. In the first place the cost of the unit is relatively high due to the large number of signals or pins that must be provided, that is one signal for each trunk, extension line and cord of the switchboard. Further, the arrangement is lacking in the ability to allow control of certain essential operating functions, such as, for example, determining priority status for answering, identification of type of waiting call, and whether the signal is steady or flashing as in "recall."

Accordingly, it is an object of the present invention to improve the operation of switchboards equipped with braille applique units.

Another object of the invention is to facilitate the efficient operation of a manual telephone switchboard by blind attendants.

A more specific object of the invention is to permit efficient operation of such a switchboard through use of a minimum number of braille signals or sensing pins.

A still further specific object of the invention is to indicate to the blind attendant the nature and priority rating of each waiting call.

In accordance with a specific embodiment of the invention, a braille unit is associated with a manual telephone switchboard, the braille sensing pins of the unit being divided into three groups, an "identification" group comprising two pins, a "tens" group comprising four pins, and a "units" group also comprising four pins. The identification group operates in accordance with a special "operated-not operated" code to indicate respectively "flashing cord" (or "flashing recall"), "trunk," "station line," and "disconnect," while the tens and units groups operate in accordance with the standard braille number code to identify by number the station, trunk or cord requiring a "response" by the attendant. When a condition is present on the switchboard which requires the attendant's response, the night alarm buzzer is sounded. The attendant, thus alerted, presses a "start bar" which causes the circuit to function whereby to set the sensing pins to indicate to the attendant by "touch" the nature of the call, or signal, and the number of the cord, trunk or station involved.

A feature of the invention is an identification group of sensing pins which indicate to the attendant the nature of the call or signal, thereby permitting use of common groups of tens and units number code pins for all calls.

A further feature of the invention is a sequence circuit which assures all waiting calls being handled in proper order.

A still further feature of the invention is means for indicating "flashing recall" operations and for assigning such operations priority in answering.

A full understanding of the arrangement contemplated by the present invention, as well as an appreciation of the various advantageous features thereof, may be gained from consideration of the following detailed description in connection with the accompanying drawing, in which.

Figure 1:
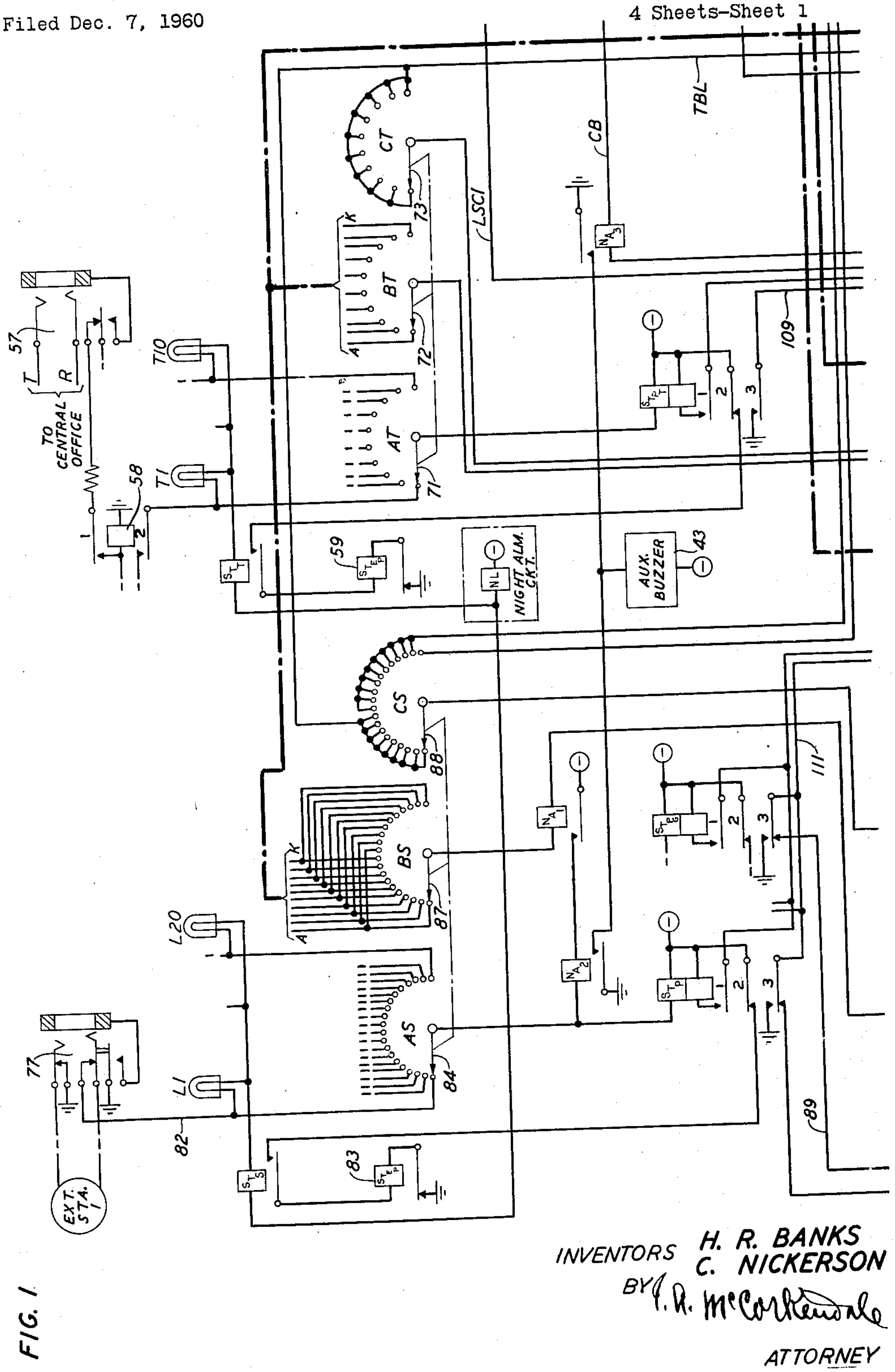
FIG. 1 shows, in partial schematic, a station line circuit and an incoming trunk circuit for use with one illustrative embodiment of the invention.
Figure 2:
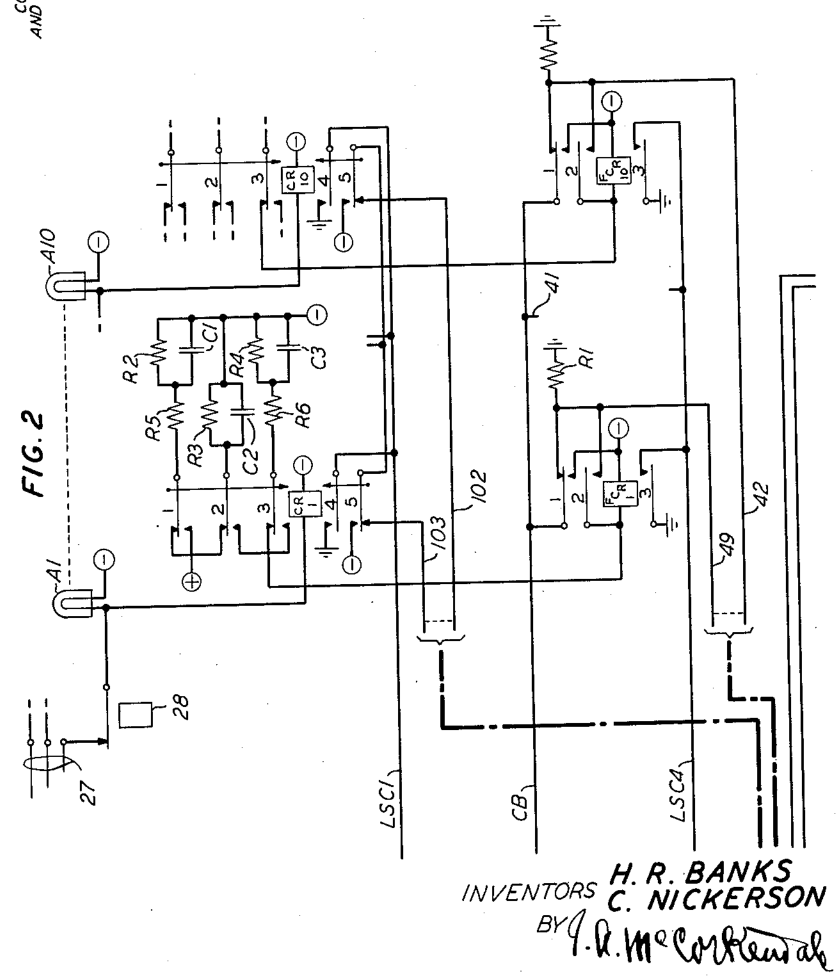
FIG. 2 shows, in partial schematic, a cord circuit, of this specific illustrative embodiment.
Figures 3, 9:
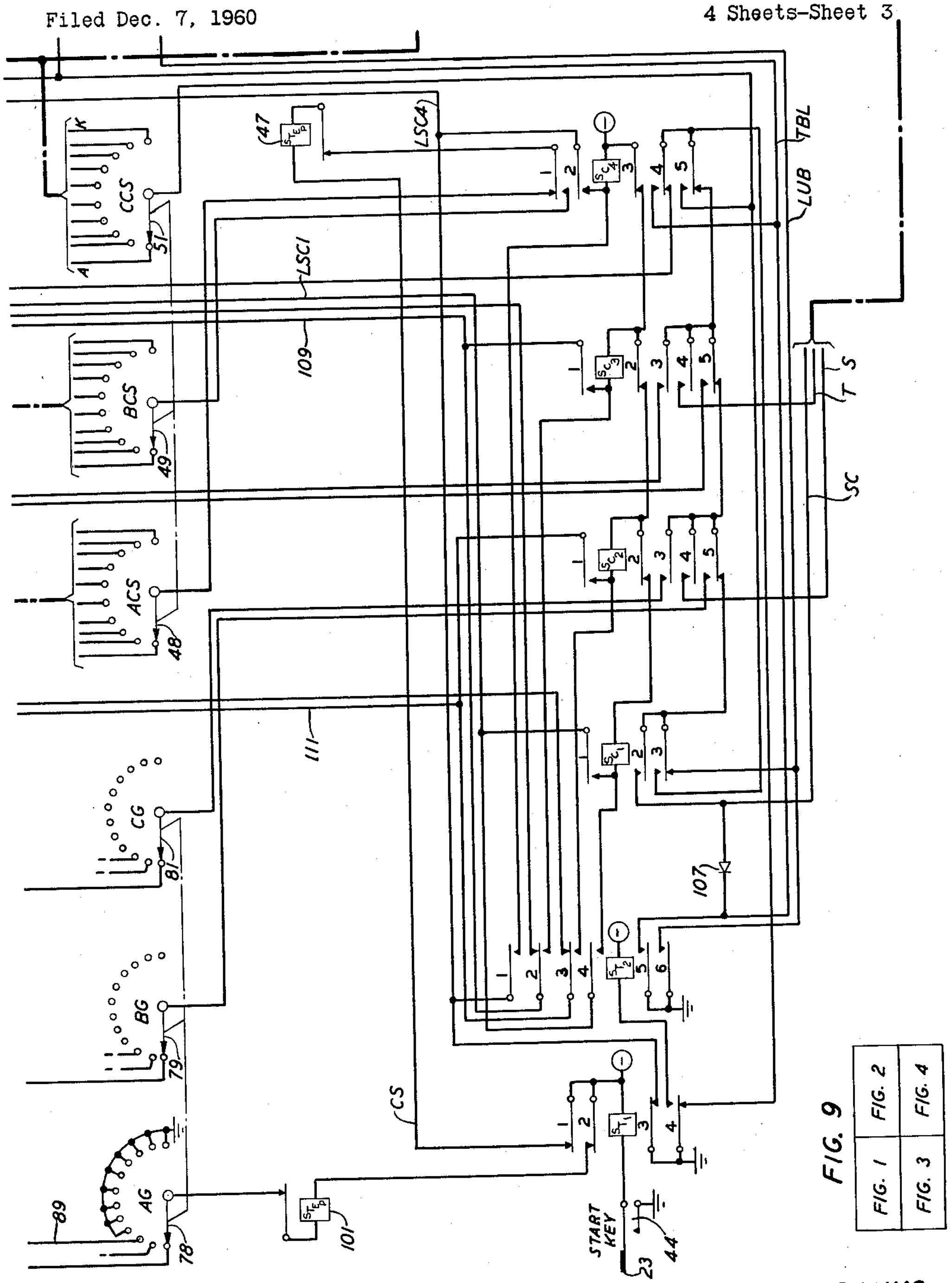
FIG. 3 shows the sequence circuit of this illustrative embodiment.

FIG. 9 indicates the manner in which FIGS. 1 to 4 should be arranged to show the complete circuit arrangement of this illustrative embodiment.

Figure 5:
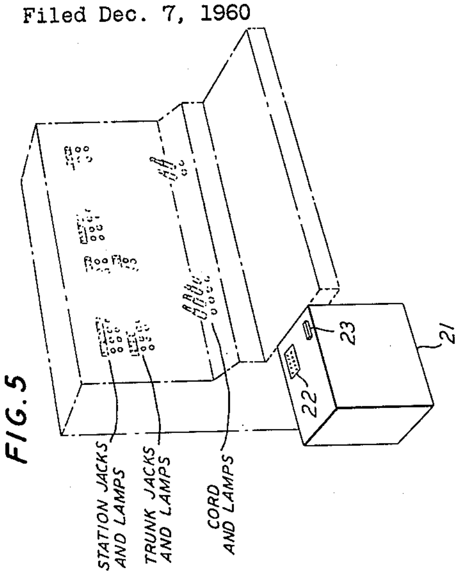
FIG. 5 shows in schematic form a portion of a manual switchboard with a braille applique unit of the nature contemplated by the present invention associated therewith.
Figure 6:
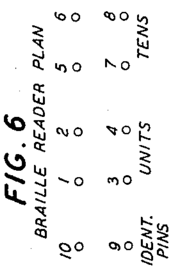
FIG. 6 shows the arrangement of the braile sensing pins of the specific illustrative embodiment.

Referring now to the drawings, it will be assumed that the braille applique unit 21 (FIG. 5) is being used in connection with a manual PBX switchboard which is equipped, by way of example only, for ten incoming trunks, twenty extension station lines and ten cords. The location of the jacks, lamps and cords on the switchboard is indicated by captions in FIG. 5. The jacks are numbered in the usual manner and, in order to facilitate operation by a blind attendant, braille numerical designations are also provided. The general arrangement of the braille reader 22 (FIG. 5) is shown in FIG. 6, and it will be noted that the reader comprises one pair of identification pins, a group of four "tens" pins and a group of four "units" pins. It will be noted, further, that the braille pin assemblies each utilize only two horizontal rows of pins rather than the three rows usually provided for general use. A "start bar" 23 is provided on the surface of the applique unit and it will be apparent from observation of FIG. 5 that the operator can readily operate the start bar 23 with her wrist or lower arm while her fingers are in position to contact the braille reader 22. The applique unit can, of course, be mounted on the right hand side of the switchboard if desired.

It is believed that the various novel features of the invention can best be described by following the operation of the circuits of the illustrated embodiment in connection with the various supervisory duties on the part of the attendant.

*Flashing Recall*

The functioning of the illustrated circuits in connection with response by the blind attendant to a "flashing recall" by a connected subscriber will be described first, since this is one of the most important duties of a PBX attendant from the standpoint of good subscriber relations, and also since, in accordance with the novel arrangement contemplated by the invention, flashing recall requests are given answering priority. In this situation, as is commonly understood, a subscriber, already connected, wishes to "bring in" the attendant for call transfer or other reasons, and accordingly, "flashes" his switchhook. In previous arrangements of switchboards for use by blind attendants considerable difficulty has been experienced in adequately handling this type of signal.

Referring first, therefore, to the circuit of FIG. 2, it will be assumed that a subscriber (not shown) is connected by way of plug 27 to the associated cord circuit. The cord circuit, which may be any one of many types of standard cord circuits well known in the art, is not disclosed in detail, and its operation will be described only to the extent necessary to describe the circuits of the present invention. Now as the subscriber, wishing to attract the attention of the attendant, flashes his receiver the line loop at the station will be alternately interrupted and reclosed. This will cause, in line with the normal operation of the line circuit, a "flashing," or intermittent, ground on the sleeve of plug 27, resulting in flashing cord lamp A1. This same intermittent ground will cause relay CR1 to operate and release in step with lamp A1. A minus voltage source is connected to the common negative sides of capacitors C3, C2 and C1. The first operation of relay CR1 (following the flashing or intermittent grounding) connects a positive voltage source through No. 1 make contact of the relay, through resistor R5 to capacitor C1 charging the latter to the desired value determined by the characteristics of the circuit elements involved. In the present instance it will be assumed for purposes of description that capacitor C1 is charged to approximately 70 v.

Upon the following release of relay CR1, the charge now on capacitor C1 is partially transferred to capacitor C2 through No. 1 break contact and No. 2 break contact of relay CR1. When relay CR1 next operates the charge now on capacitor C2 is partially supplied to capacitor C3 through No. 2 make contact and No. 3 make contact of the relay, and upon the next release of relay CR1, capacitor C3 will discharge through No. 3 break contact of relay CR1 to operate relay FCR1 over an obvious path. Resistors R2, R3 and R4 provide a decay interval whereby to prevent routine operation of the cord circuit from causing operation of relay FCR1, while the slow-to-operate characteristic of the relay prevents false operation of the circuit by "flutter" of the cord circuit during dialing.

Relay FCR1, upon operating, locks over a path from battery, winding and No. 2 make contact of relay FCR1, resistor R1 to ground, and applies negative potential through No. 1 make contact of relay FCR1 to lead CB. This negative potential is also supplied to corresponding leads of the other cord circuits, as leads 41 and 42, through the No. 1 break contacts of the respective relays, one of these, relay FCR10, being shown.

The negative potential on lead CB operates relay NA3 over a path through its operating winding, No. 4 break contact of relay SC4, No. 4 break contact of relay ST1 to ground. Operation of relay NA3 applies ground through its make contact to the auxiliary buzzer 43, causing the auxiliary buzzer to sound and alert the attendant.

The attendant, thus alerted to a "condition" (exact nature unknown to her) which requires her attention, presses start bar 23 (FIGS. 5 and 3) thereby closing start key 44 (FIG. 3) and causing operation of relay ST1 over an obvious path. Relay ST1, operated, completes a path from ground, No. 4 make contact of relay ST1, winding of relay ST2 to battery, for operation of relay ST2.

Relay SC4 of the sequence circuit (FIG. 3) operates over a path from ground, No. 3 contact of relay FCR1, lead LSC4, No. 1 contact of relay ST2, winding of relay SC4 to battery. Relay SC4, upon operating, holds to the ground on lead LSC4 through its No. 2 contact while relays FCR1 and ST2 are operated, and to the ground on the No. 3 break contact of relay ST1 when relays ST1 and FCR1 are released.

Relay SC4, upon operating, opens at its No. 4 break contact the operating path for relay NA3; relay NA3 releases and silences auxiliary buzzer 43. Also, operation of relay SC4 transfers at its No. 1 make contact the stepping magnet 47 from wiper brush 48 of bank ACS of the cord selector to wiper brush 49 of bank BCS thereof. With relay ST1 released (upon release of switch 44), the negative potential applied through its No. 1 contact to lead CS passes through the stepping magnet 47, No. 1 make contact of relay SC4, wiper 49 of bank BCS of the cord selector, combines with the negative potential applied to leads associated with nonoperated cord relays, as lead 42 of relay FCR10, and steps the switch wipers until wiper 49 engages the contact of bank BCS associated with the "flashing" cord and connected to operated relay FCR1. When this contact is reached the potential applied through stepping magnet 47 is applied over a path including lead 49 (FIG. 2) (which is connected to the proper contact on bank BCS of the cord selector) in opposition to the potential applied to the winding of relay FCR1; this causes release of relay FCR1 of the "flashing" cord.

Operation of relay SC4, as mentioned above, supplies recording ground to the translator circuit (FIG. 4) over a path from ground, No. 4 break contact of relay ST1, No. 5 make contact of relay SC4, wiper brush 51 and contact of bank CCS of the cord selector (brush 51 being in the same rotational position as brushes 48 and 49) and to the respective decade leads A to K of the units translator (FIG. 4) determined by the particular contact engaged by brush 51. It will be assumed for purposes of description that wiper brush 51 is in engagement with contact A, the No. 1 contact of the bank, and the ground will, accordingly, be applied to decade lead A of the units group; the operation of the translator circuits will be described shortly.

Figure 7:
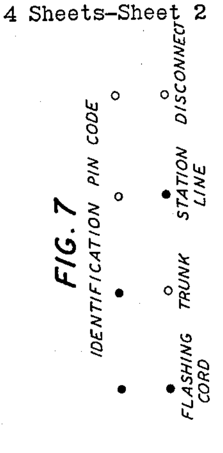
FIG. 7 is a chart illustrating the identification pin code.

At this time, that is upon operation of relay SC4, a "blanking" ground for the "tens" unit of the translator is also supplied from ground, No. 4 break contact of relay ST1, No. 4 make contact of relay SC4, lead TBL, winding of relay TB to battery, relay TB being held operated over this path for a purpose which will be described subsequently. Braille pins No. 9 and No. 10 of the reader plan operate, as described immediately below in connection with the translator circuit, whereby to indicate "Flashing Cord" in accordance with the identification pin code (FIG. 7).

*Translator Circuit*

Figure 4:
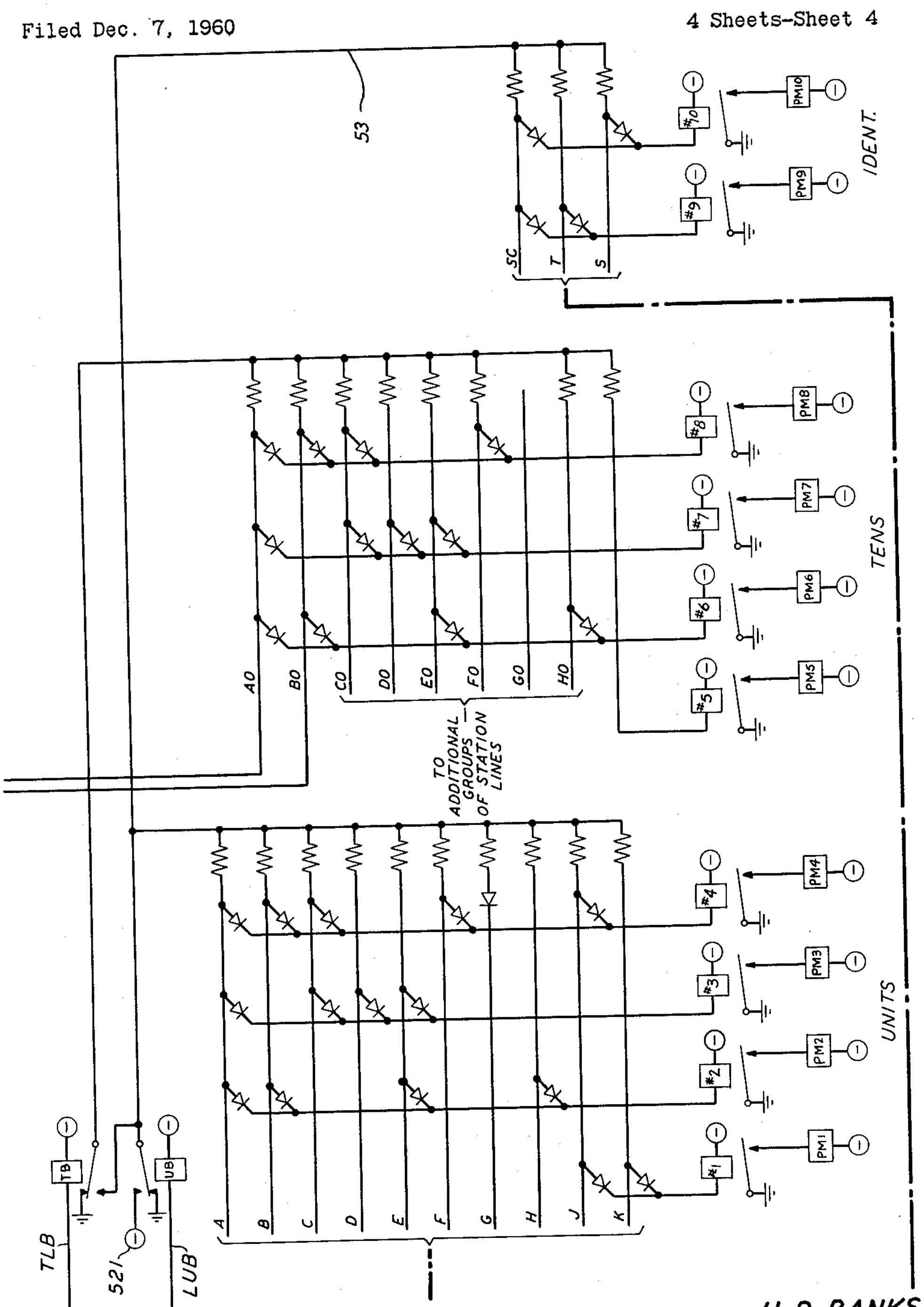
FIG. 4 shows the translator circuit of the specific illustrative embodiment.

Referring now particularly to FIG. 4 for description of the translator circuit and for further description of the "flashing recall," the translator circuit includes, in general, three sections, "units," "tens" and "identification." Relay UB is normally held operated from the sequence circuit over a path from ground, No. 4 break contact of relay ST1, No. 5 break contacts of relays SC4, SC3, SC2, No. 3 break contact of relay SC1, lead LUB, winding of relay UB to battery; ground is normally supplied by relays UB and TB, through the respective resistors shown, to decade leads A to H inclusive and J and K of the units group, decade leads A0 to H0 of the tens group and identification leads SC (station cord), T (trunk) and S (station line). This applies a forward bias on the translator diodes holding relays No. 1 to No. 10 operated and leaving pin magnets PM1 to PM10 deenergized with no braille pins projected. When relay UB is released, a cut-off bias is applied from source 52 through the respective resistors, decade leads and identification leads which is effective to release all relays except any whose associated decade lead has been energized with a recording ground as above described. For purposes of further description let us go back to the point in the description of FIG. 3 where it was stated that a recording ground was supplied upon operation of relay SC4 to the particular one of decade leads A to K of the units group determined by the position of brush 51 of bank CCS of the cord selector, and it will be recalled that for purposes of description this recording ground was assumed to be supplied to decade lead A. Also, it was pointed out that at this same time a blanking ground for the tens group was also supplied over lead TBL to the winding of relay TB, being effective to hold that relay operated. The tens group is "blanked" in this instance since there are only ten cords and any of the ten can be fully identified by the units group alone. We have, accordingly, decade lead A marked by recording ground, all other decade and identification leads ungrounded, and relay TB held operated by the "blanking" ground.

Figure 8:
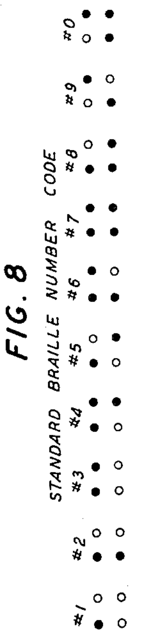
FIG. 8 shows the standard braille number code.

When relay SC4 operated, as above described, the normal holding path of relay UB was opened at the No. 5 break contact of relay SC4 causing relay UB to release. This applied potential from source 52 to the decade leads A to H, J and K of the units group which causes the release of relay No. 1, the only relay of the four which has no connection to grounded lead A. Relay No. 1 upon releasing energizes pin magnet PM1 and causes the No. 1 pin of the "units" group of the braille reader plan 22 (FIG. 5) to project. As shown in FIG. 8, this is the braille designation for No. 1 and indicates to the attendant the actuation of the "No. 1" indication.

Since as pointed out above relay TB is held operated by the blanking ground, the potential from source 52 is not supplied to the decade leads of the "tens" group, none of the relays in the group operates and no braille pins in the tens group are projected. However, the potential is supplied over lead 53 to the identification group, and, since leads SC, T, and S are open and ungrounded at this time, relays No. 9 and No. 10 are released; this operates pin magnets PM9 and PM10 whereby to project both identification pins No. 9 and No. 10. As shown in FIG. 7 this is the code for "flashing cord" so that the attendant upon "reading" No. 1 pin in the units groups and pins No. 9 and No. 10 in the identification group knows that she should respond to a flashing recall on cord No. 1 of the switchboard.

After acting on the flashing recall signal the attendant then again depresses start bar 23 which, as above described, causes operation of relays ST1 and ST2. This removes, at No. 3 break contact of relay ST1, the ground from lead LSC4 and releases relay SC4 which was holding to this ground. Release of relay SC4 restores the circuit to normal.

It will be understood, of course, that the particular decade lead of the units group to which the recording ground is applied depends upon the position of wiper brush 51 of the CCS bank of the cord selector and that this, in turn, depends upon which of the ten cords has the flashing recall action applied thereto. The relay, or relays, of the units group which will release upon release of relay UB depends, of course, upon which decade lead is grounded. For example, if lead D is grounded, representing cord No. 4, all relays not connected to lead D, namely relay No. 1, relay No. 2 and relay No. 4 will release bringing up braille pins No. 1, No. 2 and No. 4 which, as shown in FIG. 8, is the braille code for the digit 4. All pins, the code for the digit 7, are brought up when lead G (corresponding to cord No. 7) is grounded since none of the four relays is connected to this lead.

It is apparent, therefore, that through use of the novel features of the present invention the identification and handling of flashing recall requests by the blind attendant are facilitated and such requests are handled accurately and easily. Further, it will be noted that only two sets of braille sensing pins are required in the operation, one set of two pins and one set of four pins.

*Incoming Call Over Trunk*

In order to further describe the operation of the novel arrangement contemplated by the present invention, let us assume now that an incoming call is being received at the switchboard over trunk 57 which, it will be assumed, is connected to a telephone central office. The trunk circuit, which may be any one of many types of standard trunk circuits well known in the art, is not disclosed in detail, and its operation will be described only to the extent necessary to describe the circuits of the present invention.

When a trunk lamp, for example lamp T1 associated with trunk No. 1, is lighted through normal operation of the trunk circuit whereby to indicate an incoming call, ground is applied by operation of relay 58 to the corresponding contact of bank AT of the trunk selector, here assumed to be No. 1 contact. The operating winding of relay STT is connected in series with the common connection of the trunk lamps (only T1 and T10 shown) and the winding of relay NL of the night alarm circuit to battery, so that when the cord lamp is lighted, relay STT operates and the night alarm buzzer is sounded (through operation of relay NL).

Relay STT, operated, completes an operating path for stepping magnet 59 of the trunk selector traced from battery, No. 2 break contact of relay STPT, make contact of relay STT, operating winding of stepping magnet 59 to ground; stepping magnet 59 operates to step wiper brush 71 of bank AT, and the connected wiper brushes 72 and 73 of respective banks BT and CT, until brush 71 engages the contact of bank AT which is grounded by the presence of the incoming call, in this instance assumed to be contact No. 1. When this grounded contact is engaged by wiper brush 71, relay STPT is operated over an obvious path thus opening at its No. 2 break contact the operating path for stepping magnet 59 and stopping rotation of the trunk selector with brush 71 engaging the grounded contact of bank AT.

Relay STPT, upon operating, is held over a path from battery, lower winding and No. 1 make contact of relay STPT, No. 2 break contact of relay ST2, No. 3 make contact of relay STPT to ground.

It was pointed out above that flashing recall requests are given answering priority, and it will be recalled from the previous description that in the instance of a flashing recall situation relay SC4 of the sequence circuit was operated. It will be assumed in the present instance that no flashing recall request is "standing" on the board, and that relay SC4 accordingly is released.

The attendant being alerted by the night alarm buzzer but, of course, not knowing the class or identity of the call, will press start bar 23 thus closing start key 44 (FIG. 3). As before described, relay ST1 operates upon closure of key 44, and this in turn causes operation of relay ST2.

Since relay SC4 is asumed to be in released position as stated above, operation of relay ST2 completes an operating path for relay SC3, traced from ground, No. 3 make contact of relay STPT, No. 2 make contact of relay ST2, winding of relay SC3, No. 3 break contact of relay SC4 to battery; relay SC3 upon operating holds to this ground through its No. 1 make contact.

When the start bar 23 is released by the attendant relays ST1 and ST2 release. Release of relay ST1, with relay SC3 operated, connects recording ground from No. 4 break contact of relay ST1, No. 5 break contact of relay SC4, No. 5 make contact of relay SC3 and through wiper brush 72 and the engaged contact of bank BT of the trunk selector to the particular decade lead of the units group (FIG. 4) to which the engaged contact of bank BT is connected. As pointed out above, it is assumed to be contact No. 1, the contact corresponding to trunk No. 1.

A blanking ground is supplied from the same source through No. 3 make contact of relay SC3, brush 73 and contacts of bank CT of the trunk selector over lead TBL, winding of relay TB to battery; this holds relay TB operated.

Finally, identification ground, also from the same source, is applied through No. 4 make contact of relay SC3 to the T lead of the identification group (FIG. 4).

The translator circuit (FIG. 4) operates in the same general manner as described above in connection with the flashing recall request. Thus, as relay UB is released by release of relay ST2 and removal of ground from lead LUB, potential is applied from source 52 to all decade leads of the units group and, as described above, relay No. 1, the only relay not connected to lead A (to which is connected a recording ground) is released, operating pin magnet PM1 and bringing up braille sensing pin No. 1 of the units group to indicate the digit one. At this same time relay TB is held operated by the blanking ground and no relay in the tens group is released (since there are only ten trunks provided according to the specific illustrative embodiment all trunks can be identified by the units group alone).

When relay UB releases, as above, battery is also applied over lead 53 to the identification unit, and relay No. 10, which is not connected to lead T (to which is applied the identification ground), will release, operating pin magnet PM No. 10 and bringing up braille sensing pin No. 10 to form the "trunk" code (FIG. 7). The attendant then upon "reading" the braille reader 22 knows that a trunk call is being received and that trunk No. 1 is involved. After handling the call, a subsequent operation of start key 44 momentarily operates the ST1 and ST2 relays, opens the holding path for the STPT relay and restores the circuit to normal.

The particular decade lead of the units group to which the recording ground is applied will, of course, depend upon the position of the wiper brushes 72 and 71 of the trunk selector, and this in turn will depend upon the particular trunk in the group provided over which the incoming call is being received.

*Call from PBX Extension Station*

In order to still further describe the operation of the circuits of the specific illustrative embodiment of the invention disclosed, it will now be assumed that a call is being received from one of the extension stations of the PBX. By way of illustration it will be assumed the call is being received from extension station No. 1 which is connected to sation jack 77 of the switchboard. As in the instance of the cord and trunk circuits referred to above, the extension line circuit may be any one of many types of subscriber's line circuits well known in the art. Accordingly it will not be disclosed in detail and its operation will be described only to the extent necessary to describe the circuits of the present invention.

The switchboard (FIG. 5) will be assumed to be equipped for twenty extension stations numbered 1 to 20 and the line lamps for two of these station lines, L1 and L20, are shown in FIG. 1. The complete identification circuits of the other lines, including line 20, are not shown in detail since their operation is similar to that of line No. 1.

The arrangement illustrated can readily be utilized to serve a substantially larger number of extension station lines than the twenty lines mentioned above; in fact, the limiting factor is one of the operating range of the attendant rather than circuit capability. In order to facilitate serving a larger number of lines, a group selector, comprising wiper brushes 78, 79 and 81 and contact banks AG, BG and CG, is provided which can be utilized to switch the facilities of the arrangement among several different groups of lines.

Now when the subscriber at extension station No. 1 removes his handset for initiation of a call, the line loop will be closed at his station and ground from the upper break contact of jack 77 will be supplied through the closed loop and over lead 82 to the contact of bank AS of the station selector which is associated with the particular extension station. In the illustrative example, of course, this will be contact No. 1 associated with extension station No. 1. This ground is also connected to one side of the associated line lamp L1, and relay STS operates from the ground, through lamp L1, winding of relay STS, winding of night alarm relay NL to battery; lamp L1 lights and relay NL operates over this path to energize the night alarm buzzer.

Relay STS, operated, closes a path from ground, winding of stepping magnet 83, make contact of relay STS, No. 2 break contact of relay STP to battery. Stepping magnet 83 is energized over this path to step the wiper brushes of the station selector until brush 84 of bank AS engages the contact which corresponds to the calling extension station, that is, in the illustrative example, contact No. 1. When brush 84 engages contact No. 1, which, as above explained, is grounded, relay STP will operate over an obvious path. Relay STP, upon operating, opens at its No. 2 break contact the energizing path for stepping magnet 83 and rotation of the station selector is stopped with brushes 84, 87 and 88 in engagement with contacts No. 1 of the respective banks AS, BS and CS.

Relay STP, operated, holds over a path from battery, lower winding and No. 1 make contact of relay STP, No. 3 break contact of relay ST2, No. 3 make contact of relay STP to ground. Also, operation of relay STP grounds at its No. 3 make contact all "group" leads of other groups of extension stations to be served by the arrangement. As typical, one such group lead 89 is shown which is associated with relay STPG, a relay serving a similar purpose in an additional group as that served by relay STP in the illustrated group. This grounding of the other group leads completes an energizing path for stepping magnet 101 of the group selector from battery, break contact No. 2 of relay ST1, winding of stepping magnet 101, brush 78 to the grounded contacts of bank AG. Brush 78 is therefore stepped until contact is made with the ungrounded contact of bank AG associated with the illustrated group. In the present instance this is contact No. 1 which is ungrounded by operation of relay STP. Corresponding rotation of brushes 79 and 81 connects leads of the sequence circuit to this same group.

The attendant alerted to the call by the night alarm buzzer presses start bar 23 and closes start key 44. This action causes operation of relays ST1 and ST2 as previously described. Assuming that relays SC3 and SC4 of the sequence circuit are not operated due to higher priority calls (the overall functioning of the sequence circuit will be described subsequently), relay SC2 will now operate over a path from battery, No. 3 break contact of relay SC4, No. 2 break contact of relay SC3, winding of relay SC2, No. 3 make contact of relay ST2, No. 3 make contact of relay STP to ground. Relay SC2, upon operating, holds to this same ground through its No. 1 make contact.

Now when the attendant releases start bar 23, relays ST1 and ST2 release. When relays ST1 and ST2 release, recording ground is supplied from break contact No. 4 of relay ST1, break contact No. 5 of relay SC4, break contact No. 5 of relay SC3, make contact No. 5 of relay SC2, wiper brush 79 and contact No. 1 (corresponding to the group illustrated) of bank BG of the group selector, winding of relay NA1 of the night alarm circuit, brush 87 and No. 1 contact (corresponding to Station No. 1) of bank BS of the station selector to decade lead A of the units group of the translator (FIG. 4).

At this same time, ground is supplied over the first portion of the path just described, make contact No. 3 of relay SC2, brush 81 and No. 1 contact of bank CG of the group selector, brush 88 and No. 1 contact of bank CS of the station selector, lead TBL, winding of relay TB to battery, relay TB being held operated by this "blanking" ground. Since only the units group is required for identification of stations No. 1 to No. 9, the first nine terminals of bank CS are strapped and commonly connected to lead TBL. Ground applied to the first nine contacts, therefore, will act as a blanking ground for the tens group while ground applied to subsequent contacts will act as a recording ground.

Ground is also applied over the first portion of the above path, No. 4 make contact of relay SC2, to lead S of the identification group.

Now, as before described, when relay ST2 released, ground is removed from the LUB lead (relay SC2 being operated) and relay UB releases and supplies biasing potential to the decade leads of the units groups and over lead 53 to the leads of the identification group. Since relay TB is held operated by the blanking ground applied over lead TBL, potential is not supplied at this time to the tens group.

Relay No. 1 of the units group, the only relay not connected to grounded decade lead A, and relay No. 9 of the identification group, the relay not connected to lead S, now release and cause operation of pin magnets PM1 and PM9, respectively, to bring up indication of the digit "one" in the units group of the braille reader and indication of "station line" in the identification group. The attendant "reading" the pins knows that there is an incoming call on station line No. 1. When she responds to the call by inserting her answering plug in jack 77, the ground is removed from lead 82. A subsequent operation of start bar 23 momentarily operates relay ST2 thereby opening the holding paths of relays STP and SC2 and restoring the circuit to normal.

It will be understood that in the above instance had a station been involved having a number higher than 9 then the tens group of the translator would also have been utilized. For example, had station No. 11 initiated a call, brushes 84, 87 and 88 would then be in engagement with contacts No. 11 of respective banks AS, BS and CS. It is noted that contact No. 11 of bank BS is multipled to contact No. 1 and, therefore, would apply ground to decade lead A of the units group to bring up digit one. It is further noted that contact No. 11 of bank CS is connected to decade lead A0 of the tens group whereby to bring up the digit one in the tens group also. The attendant would, therefore, read "eleven." Engagement of the contact No. 20 would, in the same manner, bring up "zero" in the units group and "two" in the tens groups.

If the extension subscriber initiating the call wished to be connected to another extension of the PBX, the attendant should "challenge" the call by some such expression as "number please" in order that she might complete the call, whereas if the subscriber merely wishes to be connected to a trunk for an outside call, the attendant need not challenge the call but should make the connection to a trunk forthwith. It may be arranged that, in its first instance, the subscriber will flash thereby causing intermittent operation of the night alarm buzzer while, in the second instance, a steady signal is given. In the first instance, should an additional call be waiting, the night alarm buzzer will sound steady even though the first subscriber is flashing. However, after the start bar has been operated and the number is being recorded, auxiliary buzzer 43 will be brought in by operation of relays NA1 and NA2 and this buzzer will operate intermittently if the subscriber is flashing. The auxiliary buzzer is given a distinctive tone whereby its intermittent operation can be detected over the steady operation of the regular night alarm buzzer.

*Disconnect*

For purposes of efficient operation it is important, of course, that the attendant be able to recognize disconnect signals and to promptly identify the source thereof in order that the connection may be "taken down." For purposes of further description let us assume, therefore, the extension station disconnects thereby lighting the cord lamp of the particular cord involved, here assumed to be cord No. 1 and cord lamp A1 (FIG. 2). The ground on the sleeve of plug 27, when the subscriber goes "on hook," in addition to causing lamp A1 to light, also causes operation of relay CR1 over an obvious path.

Relay CR1, operated, supplies battery potential from its No. 5 make contact to leads associated with all non-operated "CR" relays of the other cord circuits. Only one of these additional relays is shown, relay CR10 of cord No. 10, and it will be noted that the potential is supplied through the No. 5 break contact of relay CR10 to the associated lead 102. It will be noted that the corresponding lead 103 of relay CR1 is open since that relay is operated, and, further, that these leads are connected to the respective contacts of bank ACS of the cord selector (FIG. 3). Now battery is connected to wiper brush 48, over a path from battery, No. 1 break contact of relay ST1, lead CS, stepping magnet 47 of the cord selector, No. 1 break contact of relay SC4 (assuming that relay is not operated by a higher priority call) to brush 48. This potential combines with the potential applied over lead 102, and similar leads of unoperated "CR" relays, to energize magnet 47 and step wiper brush 48 (and connected brushes 49 and 51) until the "open" contact of bank ACS is reached, this being the particular contact to which lead 103 is connected and which corresponds to cord No. 1.

The attendant, alerted by the night alarm buzzer sounding upon cord lamp A1 lighting in line with the normal operation of the switchboard circuits, presses start bar 23 which, as previously described, closes start key 44 thus operating relays ST1 and ST2.

Operation of relay ST2 completes an operating path for relay SC1 traced from battery, No. 3 break contact of relay SC4, No. 2 break contact of relay SC3, No. 2 break contact of relay SC2, winding of relay SC1, No. 4 make contact of relay ST2, lead LSC1, No. 4 make contact of relay CR1 to ground. Relay SC1 operates over this path and locks through its No. 1 make contact to the same ground. Relays ST1 and ST2 subsequently release when the attendant releases start bar 23.

Relay SC1, operated, provides recording ground to the units group of the translator (FIG. 4) over a path from ground, No. 4 break contact of relay ST1, No. 5 break contacts of respective relays SC4, SC3 and SC2, No. 3 make contact of relay SC1, wiper brush 51 and contact No. 1 of the cord selector (since cord No. 1 is the cord involved in the disconnect) to decade lead A of the units group of the translator. A blanking ground is also supplied from the same ground source through No. 2 make contact of relay SC1 to the idenification lead SC of the identification group (FIG. 4). This blanking ground is also supplied through the same No. 2 make contact of relay SC1, diode 107, lead TBL through the winding of relay TB to battery, whereby to hold relay TB operated.

Now when relay ST2 released, the holding path of relay UB was opened and the relay released thereby applying biasing potential from source 52 to the decade leads of the units group and the SC, T and S leads of the identification group. Since relay TB is held operated by the blanking ground applied over lead TBL, potential is not applied to the decade leads of the tens group at this time. Relay No. 1 of the units group of the translator will release, this being the only relay of the group not connected to the grounded decade lead A. This will bring up pin No. 1 of the units group of the braille reader to form the digit "one." Since both relays of the identification group are connected to the grounded SC lead, neither will release and neither pin of the identification group of the braille reader will be brought up, thus leaving the "disconnect" code as shown in FIG. 7. Accordingly, the attendant "reading" the braille reader 22 (FIG. 5) will know there is a disconnect on cord No. 1 and will take down that cord. It will be understood, of course, that the particular relay operated in the units group, and consequently the pin or pins brought up in the braille reader will depend upon the standing position of the brushes 48, 49 and 51 of the cord selector, and that this, in turn, is dependent upon the particular cord involved in the disconnect.

*Sequence Circuit*

While the operation of the sequence circuit (FIG. 3) has been described above in connection with the several different operations of the over-all circuit, separate brief reference may well be made here to certain of the novel features thereof. The arrangement of the sequence circuit is such that so long as there are calls or signals "standing on the board" when the attendant operates her start bar, these will be passed to the attendant in the proper order as to priority. As pointed out above, flashing recall signals are given top priority, and it will be recalled from description of the handling of a flashing recall request that relay SC4, the first in the sequence chain, was operated.

The sequence circuit receives ground signals over leads LSC4, 109, 111 and LSC1. After selecting the signal of highest priority by the sequence chain referred to below, the sequence circuit transmits recording and blanking grounds as described in detail above. The sequence chain circuit, which controls the operation of the relay associated with the highest priority signals, leads from battery on break contact No. 3 of relay SC4 (the highest priority relay functioning on flashing recalls), break contact No. 2 of relay SC3, break contact No. 2 of relay SC2 to the winding of relay SC1 (the lowest priority relay) for operation thereof in the event no one of the higher priority relays is operated. It will be clear from the circuit configuration shown that the respective relays operate when ground is applied to their associated controlling leads when, and if, all higher priority relays are non-operated.

While certain specific embodiments of the invention have been selected for detailed disclosure, the invention is not, of course, limited in its application to the embodiments disclosed. The embodiments which have been described should be taken as illustrative rather than restrictive thereof.

What is claimed is:

1. In a manual telephone switchboard, a plurality of types of terminating and connecting elements for utilization by an attendant in the answering, completion and supervision of calls, a tactile indicator for facilitating operation of the switchboard by a blind attendant, said indicator comprising a plurality of sensing pins selectively operable to indicate in code the type of a particular element involved in an operation and the identification by number of the specific element of said indicated type, and means for operating said tactile indicator to handle in sequence a plurality of accumulated attendant-alerting signals on said switchboard in accordance with the priority rating of said signals.

2. In a manual telephone switchboard, a plurality of switching and connecting elements for utilization by an attendant in the answering, completion and supervision of calls, a tactile indicator including a first group of sensing pins common to said elements for indicating by braille code the identification of a respective element and a second group of sensing pins, and means, effective upon occurrence of a condition on said switchboard requiring utilization of said elements by the attendant, for operating pins in said first group to indicate the numerical designation of the element involved and for operating pins in said second group to indicate the nature of the answering, completing or supervising operation involved.

3. In a manual telephone switchboard, a plurality of trunks terminating at said switchboard, a plurality of local station lines terminating at said switchboard, a plurality of cords for interconnecting said trunks and said local station lines, a tactile indicator including a plurality of selectively operable sensing pins arranged in a plurality of groups, and means effective upon occurrence of a condition on the switchboard which requires a response by the attendant for selectively operating pins in one of said groups to indicate the nature of said condition and for selectively operating pins in another of said groups to indicate the numerical designation of the trunk, cord or local station line directly involved in said condition.

4. In a manual telephone switchboard, a plurality of trunks terminating in jacks at said switchboard, a plurality of local station lines also terminating in jacks at said switchboard, a plurality of cords with associated circuits for interconnecting selected ones of said jacks, a tactile indicator for facilitating operation of said switchboard by a blind attendant, said tactile indicator comprising a numerical indication group common to said trunks, lines and cords and a condition identification group also common to said trunks, lines and cords, and means effective upon occurrence of attendant-alerting signals on said switchboard for operating said numerical identification group whereby to indicate the numerical designation of the trunk, line or cord initiating the signal and to operate said condition identification group whereby to identify the origin of the signal as to trunk, line or cord.

5. In a manual telephone switchboard, a plurality of trunks terminating in jacks at said switchboard, a plurality of local station lines also terminating in jacks at said switchboard, a plurality of cords with associated circuits for interconnecting selected ones of said jacks, a tactile indicator at said switchboard including a first group of four selectively operable sensing pins for indicating numbers in the units group according to braille code, a second group of four selectively operable sensing pins for indicating numbers in the tens group according to braille code and a third group of two selectively operable pins for identifying in code a plurality of different conditions, means effective upon occurrence of a condition on one of said trunks, lines or cords which requires a response by the attendant for actuating said first and second groups whereby to indicate the numerical identification of the trunk, line or cord directly involved in said last-mentioned condition, and for actuating said third group whereby to identify the nature of the condition.

6. In a manual telephone switchboard, a plurality of trunks terminating in jacks at said switchboard, a plurality of local station lines also terminating in jacks at said switchboard, a plurality of cords with associated circuits for interconnecting selected ones of said jacks, a tactile indicator comprising a plurality of selectively operable sensing pins for facilitating operation of said switchboard by a blind attendant, said tactile indicator including a numerical indication group of pins common to said trunks, lines and cords, and a condition identification group of pins also common to said trunks, lines and cords, visual attendant-alerting signals individually associated with each of said jacks and cords, a common audible alerting signal, means operable from a local station when one of said cords is connected to said local station for intermittently operating said common audible signal and the particular one of said visual signals associated with said one cord, and means for operating said identification group of pins to indicate in code a flashing cord condition and to operate said numerical indication group of pins to identify the particular cord originating the condition.

7. In a manual telephone switchboard, a plurality of trunks terminating in jacks at said switchboard, a plurality of local station lines also terminating in jacks at said switchboard, a plurality of cords with associated circuits for interconnecting selected ones of said jacks, a tactile indicator comprising a plurality of selectively operable sensing pins for facilitating operation of said switchboard by a blind attendant, said tactile indicator including a numerical indication group of pins common to said trunks, lines and cords, and a condition identification group of pins also common to said trunks, lines and cords, visual attendant-alerting signals individually associated with each of said jacks and cords, a common audible alerting signal, means operable from a local station when one of said cords is connected to said local station for intermittently operating said common audible signal and the particular one of said visual signals associated with said one cord, means for operating said identification group of pins to indicate in code a flashing cord condition and to operate said numerical indication group of pins to identify the particular cord originating the condition, and means operating in the event of an accumulation of attendant-alerting signals on said switchboard for assigning answering priority to any existing flashing cord conditions.

8. In a manual telephone switchboard, a plurality of trunks terminating in jacks at said switchboard, a plurlity of local station lines also terminating in jacks at said switchboard, a plurality of cords with associated circuits for interconnecting selected ones of said jacks, a tactile indicator comprising a plurality of selectively operated sensing pins for facilitating operation of said switchboard by a blind attendant, said indicator including a numerical indication group of pins and an identification group of pins, means effective upon occurrence of an attendant-alerting signal on said switchboard for operating said identification group of pins to indicate whether the signal was originated by a trunk, a line or a cord, and for operating said numerical indication group of pins to indicate the numerical designation of the element originating the signal.

9. In a manual telephone switchboard, a plurality of trunks terminating in jacks at said switchboard, a plurality of local station lines also terminating in jacks at said switchboard, a plurality of cords with associated circuits for interconnecting selected ones of said jacks, a tactile indicator comprising a plurality of selectively operated sensing pins for facilitating operation of said switchboard by a blind attendant, said indicator including a numerical indication group of pins and an identification group of pins, means effective upon occurrence of an attendant-alerting signal on said switchboard for operating said identification group of pins to indicate whether the signal was originated by a trunk, a line or a cord, and for operating said numerical indication group of pins to indicate the numerical designation of the element originating the signal, said identification group also being effective in the event a cord originated signal is indicated to indicate whether the signal is intermittent for flashing recall or steady for disconnect.

10. In a manual telephone switchboard, a plurality of trunks terminating in jacks at said switchboard, a plurality of local station lines also terminating in jacks at said switchboard, a plurality of cords with associated circuits for interconnecting selected ones of said jacks, a tactile indicator at said switchboard including a first group of four selectively operable sensing pins for indicating numbers in the units group according to braille code, a second group of four selectively operable sensing pins for indicating numbers in the tens group according to braille code and a third group of two selectively operable pins for identifying in code a plurality of different conditions, means effective upon occurrence of a condition on one of said trunks, lines or cords which requires a response by the attendant for actuating said first and second groups whereby to indicate the numerical identification of the trunk, line or cord directly involved in said last-mentioned condition in the event said numerical identification is a number greater than nine, and to actuate said first group and to prevent operation of said second group whereby to indicate the numerical identification of the trunk, line or cord in the event said numerical identification is a number not greater than nine, and for actuating said third group whereby to identify the nature of the condition.

11. In a manual telephone switchboard, a plurality of types of terminating and connecting elements for utilization by an attendant in the answering, completion and supervision of calls, a tactile indicator for facilitating operation by a blind attendant, said indicator comprising a plurality of sensing pins and means for selectively operating said pins to indicate in code the type of a particular element involved in an operation and the identification by number of the specific element of said indicated type, said selective operating means including an operating magnet for each pin, an operating circuit for each of said magnets, a relay associated with each of said operating circuits normally held operated whereby to hold the associated magnet operating circuit open, and means to simultaneously release selected ones of said relays whereby to close the associated operating circuits of respective pin magnets and cause the operation thereof.

References Cited in the file of this patent

FOREIGN PATENTS 389,613 Great Britain ----------- Mar. 23, 1933

OTHER REFERENCES

Bell Laboratories Record, vol. 31, page 220.